United States Patent [19]

Ducret

[11] Patent Number: 4,821,414

[45] Date of Patent: Apr. 18, 1989

[54] SWING SAW FOR CUTTING METAL CONDUIT

[76] Inventor: Lucien C. Ducret, 9 Tod's Driftway, Old Greenwich, Conn. 06870

[21] Appl. No.: 52,238

[22] Filed: May 18, 1987

[51] Int. Cl.$^4$ .............................................. B25D 9/00
[52] U.S. Cl. ........................................ 30/90.2; 30/92; 30/378; 83/168
[58] Field of Search ................... 30/372, 90.2, 92, 378; 83/743, 745, 168, 760

[56] References Cited

U.S. PATENT DOCUMENTS

| 417,093 | 12/1889 | Robison | 83/168 |
| 991,947 | 5/1911 | Campbell | 83/760 |
| 1,075,730 | 10/1918 | Ross | 83/760 |
| 1,423,504 | 7/1922 | Vernon | |
| 4,437,237 | 3/1984 | Ducret | 30/90.2 |

FOREIGN PATENT DOCUMENTS 371270 2/1922 Fed. Rep. of Germany .
513496 2/1921 France .

Primary Examiner—Frank T. Yost
Assistant Examiner—Willmon Fridie, Jr.
Attorney, Agent, or Firm—DeLio & Associates

[57] ABSTRACT

A tool for cutting a workpiece comprising a tool body; means on the tool body for securing the workpiece; a saw blade movably supported on the body for cutting the secured workpiece, the saw blade having a plurality of cutting teeth movable in a sawing direction and a feeding direction in a cutting plane extending through the workpiece; and a bushing on the tool body rotatable about an axis normal to the cutting plane, the bushing being engagable on its periphery by the saw blade teeth and rotatable thereby, after cutting of the workpiece, to restrict movement of the saw blade in the feeding direction while permitting movement of the saw blade in the sawing direction. In the preferred embodiment the bushing includes teeth on the periphery which are of comparable size and spacing to the teeth of the saw blade to clean the latter. The bushing may be made of a bronze porous powder metal which is impregnated with a lubricant for lubricating the saw blade teeth.

12 Claims, 1 Drawing Sheet

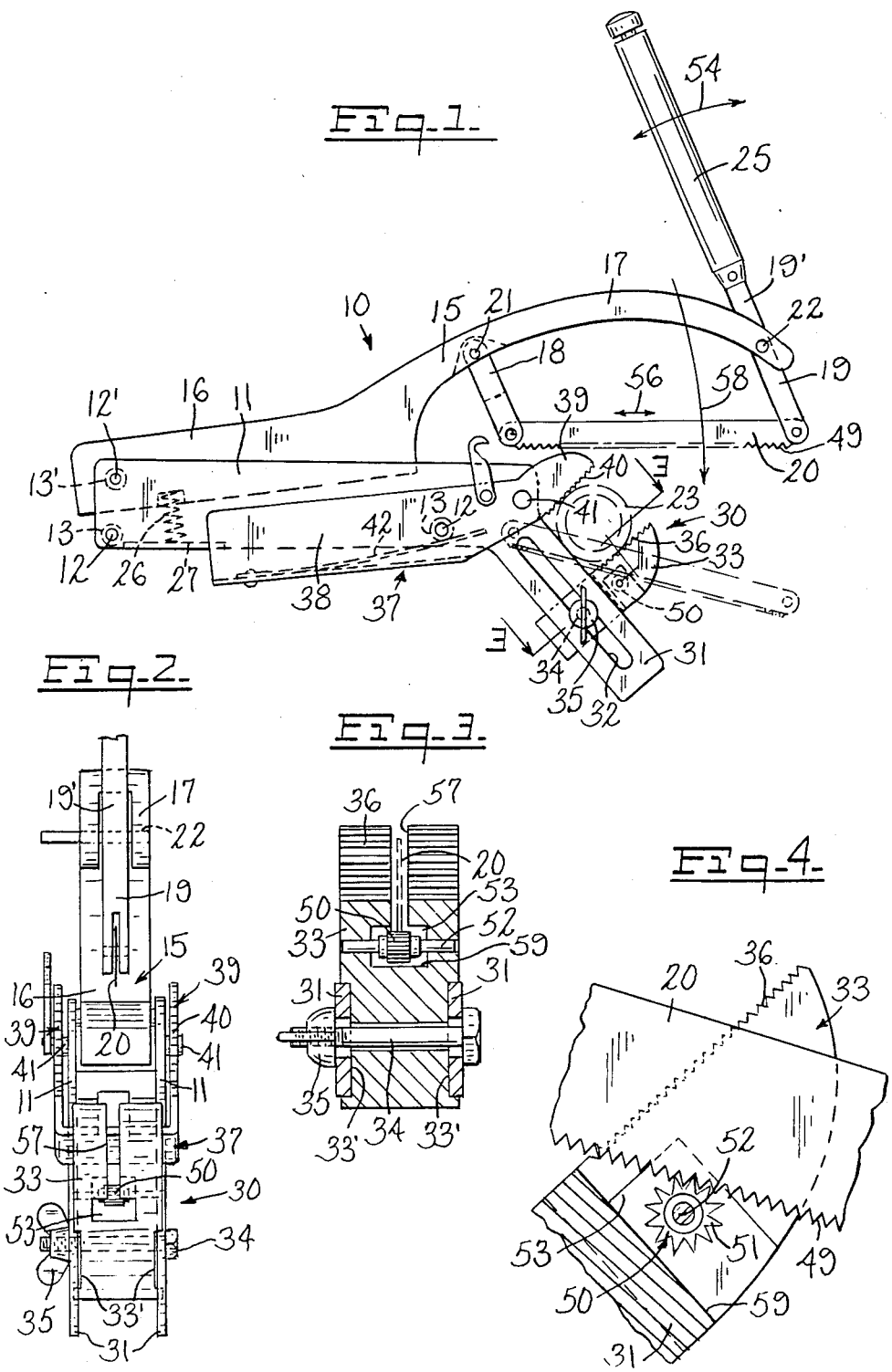

SWING SAW FOR CUTTING METAL CONDUIT

BACKGROUND OF THE INVENTION

This invention relates to an improved hand tool for cutting workpieces such as metal conduit or cable and in particular, to a device on the hand tool to restrict movement of the hand tool saw blade.

It is often necessary to cut metal, plastic or plastic clad flexible conduit outdoors or in other areas where use of electric powered cutting equipment presents a problem. In U.S. Pat. No. 4,437,237 there is disclosed a hand tool which is specially adapted for cutting flexible conduit and includes both conduit holding means and conduit cutting means. In operation, the operator grasps with one hand levers to hold the conduit and urge the saw blade against the conduit, while with the other hand the hacksaw type cutting blade is reciprocated to cut through the conduit. While this invention represents a considerable improvement over the prior art, there is no disclosure or suggestion therein of providing a means to limit cutting movement of the saw blade after the conduit has been completely cut. Consequently, it is possible for the saw blade to cut not only through the conduit, but also into and possibly through the clamping jaw holding the conduit in place. While it is possible to harden the clamping jaw to prevent damage by the saw blade, the cutting action of the saw blade against such harden jaw portions would lead to accelerated wear and replacement. Also, like all saws utilizing hacksaw type cutting blades, the teeth of the cutting blade are susceptible to being clogged by the chips being generated off the workpiece so that frequent cleaning may be required. Furthermore, there is no provision for automatically lubricating the saw blade teeth.

Bearing in mind these and other deficiencies in the prior art, it is therefore an object of the present invention to provide an improved cutting tool which reduces the possibility of damage to the saw blade and to the clamping jaw.

It is another object of the present invention to provide a cutting tool which automatically cleans the teeth of the saw blade.

It is a further object of the present invention to provide a cutting tool in which lubrication of the cutting blade teeth is automatically effected.

It is another object of the present invention to provide a cutting tool which restricts feeding movement of the saw blade after the workpiece has been severed.

It is still another object of the present invention to provide the aforementioned improvements in a hand held cutting tool.

SUMMARY OF THE INVENTION

The above and other objects, which will be apparent to those skilled in the art, are achieved in the present invention which provides a tool for cutting a workpiece comprising a tool body; means on the tool body for securing the workpiece; a saw blade movably supported on the body for cutting the secured workpiece, the saw blade having a plurality of cutting teeth movable in a sawing direction and a feeding direction in a cutting plane extending through the workpiece; and a bushing on the tool body rotatable about an axis normal to the cutting plane, the bushing being engagable on its periphery by the saw blade teeth and rotatable thereby, after cutting of the workpiece, to restrict movement of the saw blade in the feeding direction while permitting movement of the saw blade in the sawing direction.

In the preferred embodiment the bushing includes teeth on the periphery which are of comparable size and spacing to the teeth of the saw blade to clean the latter. The bushing may be made of a bronze porous powder metal which is impregnated with a lubricant for lubricating the saw blade teeth.

BRIEF DESCRIPTION OF THE DRAWINGS

FIG. 1 illustrates in a side elevation the preferred embodiment of the present invention wherein a piece of conduit is in position to be severed.

FIG. 2 is an end elevation of the embodiment of FIG. 1 viewed from the right.

FIG. 3 is a vertical section of the embodiment of FIG. 1 along the line 3—3.

FIG. 4 is a close-up side sectional view of the area of the lower jaw element of FIG. 1.

DETAILED DESCRIPTION OF THE INVENTION

While certain directional terms will be employed herein to describe the invention, such directional terms are utilized for illustration and clarification purposes only and are not to be construed as limiting the scope of the invention as claimed. Like numerals will be used to designate like features throughout the drawings.

Referring to the drawings, the body portion 10 is constituted by a pair of elongated side plates 11, held in parallel spaced relation by screws 12, 12' which pass through the bores of tubular spacers 13, 13', there being two such points of connection adjacent the left, rear end of the body portion and one near the right, forward end, as clearly appears in FIG. 1.

The saw carrier 15 comprises a handle portion 16 and a bow portion 17 integral with the handle, the handle portion being shorter than the body portion 10 and pivotally mounted thereon by means of the upper rear spacer 13'. The bow portion 17 projects forwardly from the handle portion, in a flat arch, a distance sufficient to provide a "parallelogram" mounting for the blade support links 18 and 19 carrying a hacksaw-type blade 20. The link 18 is pivotally mounted at a point 21 near the base of the bow portion and the link 19 is mounted at the forward end of the bow portion at the point 22, this forward link having an upward extension 19' on which is mounted a foldable handle 25. The saw carrier assembly is biased toward the raised position shown in FIG. 1 by a spring 26 which rests on a short "floor" piece 27 horizontally extending between the plates 11 near their rear ends.

The conduit clamp 30 is constituted by elongated parallel clamp plates 31, preferably integral with side plates 11 and projecting downwardly and forwardly from the forward ends of the side plates. The clamp plates are provided with elongated slots 32 and a lower clamp jaw 33 is slidably mounted between the plates, being held in any desired adjusted position by means of a bolt 34 (FIG. 3) passing through a hole in the clamp jaw, through the slots 32 and carrying the wing nut 35 adjacent its free end. The sides of the clamp jaw are rabbeted as shown at 33' to form rectangular grooves which receive the plates 31 with a close sliding fit, so that the jaw maintains a constant angle with said plates in every adjusted position. The working face 36 of the clamp jaw 33 is serrated and it is deeply slotted as shown in FIG. 3, to receive saw blade 20 during severing of the workpiece. The clamp is completed by the clamping lever 37, having a handle portion 38 (channel-shaped in cross-section, FIG. 2) and a pair of spaced parallel jaw portions 39 each having a serrated edge 40 which form the complementary working face opposite the clamp jaw face 36. The lever 37 is pivotally mounted on the side plates 11 of body portion 10 by means of separate pivots 41, one on each side to leave clear the space between side plates 11. The pivots 41 may be screws or rivets, and the lever 37 is biased toward a clamp open position by the leaf spring 42 bearing against the forward spacer 13.

As shown in FIG. 1, saw blade 20 is reciprocated in the sawing direction shown by arrow 56 back and forth in an essentially horizontal direction by movement of handle 25 in direction 54 as shown. The direction of feeding of saw blade 20 is shown by arrow 58 which is an essentially vertical downward direction as shown. Sawing direction 56 and saw blade feeding direction 58 are essentially perpendicular, and both lie in the cutting plane of saw blade 20 which extends down into and through conduit workpiece 23 and clamping jaw 30.

To prevent damage to clamping jaw 30, a bushing is disposed on lower clamping jaw element 33 to restrict feeding movement of saw blade 20 in its cutting plane after the workpiece has been cut but before the saw blade touches the clamping jaw. Bushing 50 is rotatably mounted on an axis 52 which is normal to the cutting plane and secured at each end to lower clamping jaw element 33. The bushing 50 is centered in jaw cavity 53 at the lower end of slot 57 of jaw element 33. Jaw slot 57 corresponds to the cutting plane of blade 20 and receives saw blade 20 during the cutting and severing of conduit workpiece 23. The width of bushing 50 is slightly greater than the width of slot 57.

As shown most clearly in FIG. 4, bushing 50 has around its outer periphery a series of teeth 51 which correspond in size and spacing to the teeth 49 of saw blade 20. As saw blade 20 cuts through workpiece conduit 23 and down towards the base 59 of lower jaw element slot 57, the saw blade teeth 49 contact the outer periphery of bushing 50 and are prevented from further downward movement in feeding direction 58. The gear-like meshing of saw blade teeth 49 with bushing teeth 51 allows for continued reciprocating movement of saw blade 20 in sawing direction 56. The limited frictional sliding between the teeth surfaces of saw blade 49 and bushing 51 prevents excessive wear of either sets of teeth and, consequently, neither should need to be replaced frequently.

In addition to limiting the movement of saw blade 20 in the feeding direction of its cutting plane, the teeth 51 about the periphery of bushing 50 also serve to clean accumulated chips and other debris from between saw blade teeth 49. By utilizing a bronze bushing of a porous powder metal construction, the bushing may be impregnated or infiltrated with oil or other lubricant to lubricate the saw blade teeth during meshing contact.

In the operation of the tool shown in FIGS. 1 to 4, the position of the lower jaw 33 is adjusted, by loosening the wing nut 35, sliding the jaw along the clamp plates 31 as required by the outside diameter of the conduit to be cut and tightening the wing nut, to hold the lower jaw in a position such that conduit workpiece 23 can be easily inserted between the face of jaw 33 and the jaw faces 40 on the jaws 39. With the saw handle 25 locked in its straight-out position (FIG. 1) the operator grasps the tool with one hand gripping the body portion 10, the handle portion 16 of the saw carrier and the handle portion 38 of the clamping lever 37. The fulcrum point 41 of the lever 37 is close to the jaw 39, so that pressure on the handle 38 effects strong and positive gripping of conduit workpiece 23 between the jaws 33 and 39. The fulcrum point of the saw carrier 15 is at the screw 12' and spacer 13', so that the same gripping force which holds the conduit very firmly serves to urge the saw carrier downward in a relatively gentle and controllable manner. When the saw blade 20 has been brought into contact with the conduit, at the point where a cut is to be made, the saw is reciprocated by the use of the operator's other hand, grasping the handle 25 and moving it back and forth in direction 54 to cause sawing movement of the blade in direction 56. Due to the linkage mounting of the saw blade the saw carrier 15 will oscillate somewhat vertically during each stroke, but short strokes are effective and the vertical oscillation can easily be accommodated by the resilience of the operator's grip on the handles. The angle of the saw teeth is preferably such that the cut material is removed primarily on the rearward (pulling) stroke of the handle. Since the jaw faces 40, 40 are widely spaced and the jaw face 36 is deeply slotted (FIG. 4) the saw blade has a clear path to be fed downward in direction 58 to cut cleanly and completely through conduit workpiece 23, while the latter is held firmly at spaced points on each side of the cutting plane.

While the clamp faces 36 and 40 are shown as being generally straight, in profile, and serrated or knurled, it will be understood that one or both faces could, if desired, be curved or V-shaped in profile.

When the saw blade has completely cut through and severed workpiece conduit 23, saw blade teeth 49 will engage bushing teeth 51 and be prevented from further downward feeding movement in direction 58 into the base of clamping jaw 30. Although movement of saw blade 20 in sawing direction 56 is not impaired, the operator will note the decrease in resistance and be aware that cutting of workpiece 23 is complete. In view of the cleaning and lubricating action of the bushing 50, the operator may wish to reciprocate saw blade 20 over bushing 50 several times after cutting is complete.

Instead of the hand operated cutting blade shown herein, the present invention may be used with powered blades, for example, the type disclosed in FIG. 11 of the aforementioned U.S. Pat. No. 4,437,237. In addition, rotary or other shaped cutting blades can be utilized in place of the straight blade shown.

Thus, the present invention provides an efficient and useful hand held cutting tool which restricts feeding movement of the saw blade and reduces the possibility of damage to the tool itself. Furthermore, the saw blade of the tool may be cleaned and lubricated between cuts to improve the life and performance of the blade.

While this invention has been described with reference to a specific embodiment, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A tool for cutting a workpiece comprising
a tool body;
means on said tool body for securing said workpiece;

a saw blade movably supported on said body for cutting the secured workpiece, said saw blade having a plurality of cutting teeth movable in a sawing direction and a feeding direction in a cutting plane extending through said workpiece; and a bushing on said tool body rotatable about an axis normal to said cutting plane, said bushing being engagable on its periphery by said saw blade teeth and rotatable thereby, after cutting of said workpiece, to prevent further movement of said saw blade in said feeding direction while permitting movement of said saw blade in said sawing direction wherein said bushing includes a plurality of teeth on said periphery to mesh with said saw blade teeth for rotating said bushing and cleaning said saw blade teeth.

2. The tool of claim 1 wherein the bushing tooth spacing corresponds to the saw blade tooth spacing.

3. The tool of claim 1 wherein the bushing tooth size corresponds to the saw blade tooth size.

4. The tool of claim 1 wherein said bushing is a lubricant-impregnated porous powder metal bushing for lubricating said saw blade teeth during meshing.

5. The tool of claim 4 wherein said bushing is made of bronze.

6. The tool of claim 1 wherein said workpiece securing means comprises a clamping jaw, and wherein said bushing is disposed on said clamping jaw to prevent said saw blade from being fed into and cutting said clamping jaw.

7. The tool of claim 6 wherein said clamping jaw has a jaw element slotted along said cutting plane to receive said saw blade, and wherein said bushing is disposed near the base of the jaw element slot.

8. The tool of claim 1 wherein said tool is a hand tool and wherein said tool body is graspable by one hand for simultaneously securing said workpiece and feeding said saw blade toward said workpiece to effect said cutting.

9. The tool of claim 8 wherein said saw blade is operable by the other hand to move said blade in a sawing direction.

10. A hand tool for cutting a workpiece comprising a tool body;

means on said tool body for securing said workpiece;

a saw blade movably supported on said body for cutting the secured workpiece, said saw blade having a plurality of cutting teeth movable in a sawing direction and a feeding direction in a cutting plane extending through said workpiece; and a bushing on said tool body rotatable about an axis normal to said cutting plane, said bushing having a plurality of teeth about its outer periphery of comparable size and spacing to said saw blade teeth, said bushing being engagable on its periphery by said saw blade teeth and rotatable thereby, after cutting of said workpiece, to clean said saw blade teeth and to restrict further movement of said saw blade in said feeding direction while permitting movement of said saw blade in said sawing direction, said tool body being graspable by one hand for simultaneously securing said workpiece and feeding said saw blade toward said workpiece to effect said cutting.

11. The hand tool of claim 10 wherein said bushing is a lubricant-impregnated, porous bronze powder metal bushing for lubricating said saw blade teeth during meshing.

12. The hand tool of claim 1 wherein saidworkpiece securing means comprises a clamping jaw having a jaw element slotted along said cutting plane to receive said saw blade, and wherein said bushing is disposed near the base of the jaw element slot to prevent said saw blade from being fed into and cutting said clamping jaw.

* * * * *